Feb. 19, 1952   R. A. ENGLERT   2,586,629
GRID CUTTING AND FORMING MACHINE
Filed June 14, 1945   4 Sheets-Sheet 1

INVENTOR.
Ralph A. Englert
BY Arthur B Richardson
ATTORNEY

Feb. 19, 1952 R. A. ENGLERT 2,586,629
GRID CUTTING AND FORMING MACHINE
Filed June 14, 1945 4 Sheets-Sheet 3

INVENTOR.
Ralph A. Englert
BY
Arthur L.B. Richardson
ATTORNEY

Feb. 19, 1952 R. A. ENGLERT 2,586,629
GRID CUTTING AND FORMING MACHINE
Filed June 14, 1945 4 Sheets-Sheet 4

INVENTOR.
Ralph A. Englert
BY
ATTORNEY

Patented Feb. 19, 1952

2,586,629

UNITED STATES PATENT OFFICE 2,586,629

GRID CUTTING AND FORMING MACHINE

Ralph A. Englert, Mill Hall, Pa., assignor to Sylvania Electric Products Inc., Emporium, Pa., a corporation of Massachusetts Application June 14, 1945, Serial No. 599,481

16 Claims. (Cl. 140—71.6)

The present invention relates to cutting and forming devices and more particularly to an apparatus combining both these features and adapted to the cutting and forming of grids, especially relatively small grids used as electrodes in radio tubes and the like.

Grids of the character just above referred to are formed of two spaced parallel wires comprising posts around which a fine wire is coiled, the successive convolutions lying in spaced grooves formed in the posts, in most instances by a cutter operating just in advance of the wire as it is wound, these grooves alternating with ridges which by a swaging tool are laid over the transverse windings to securely lock them in place and against unwinding. A grid thus formed becomes practically integral in construction.

The present method of making these grids is to wind them in comparatively long strips on lathes designed for such purpose and later, on a manually operable device to cut the strips into unit lengths. In the winding and swaging operations provision is made whereby, after the cutting has been done, loose ends of the fine wire are left so as to be broken off and leave unwound that portion of the posts to be inserted in the grid supporting means.

For convenience and economy, and to reduce handling of the grids to a minimum the manually operable cutting device is associated with the winding lathe in such manner that the operative handling the lathe can, while a strip is being automatically wound, cut a previously wound strip into unit lengths, trim off the loose ends and place the grids into individual compartments of a suitable tray.

The winding lathe also has a mandrel centered longitudinally between the supporting wires which, when cut, form the side posts of the grid. This mandrel in conjunction with the side wires determines the cross sectional area of the grid. In some instances, however, the final shape to be given the grid is such that its transverse contour cannot be formed over the mandrel in the winding operation in which event the work is necessarily subjected to an additional forming operation. And, it is with grids required to be reshaped in this manner that my invention is concerned. At present these grids, after being cut and trimmed, are transferred in trays to a second operative who runs them individually through a forming device.

To accomplish then in one operation and by one person, with certain shapes of grids, what has heretofore required two operations and as many operatives, is one of the objects of the invention.

In accomplishing the aforesaid object, additional handling of the work is eliminated and this of itself is an important object of the invention because of the delicate construction of the grid and its liability to distortion whenever handled.

A further object of the invention is the provision of a grid cutting and forming device so constructed that it may be readily substituted for the present manually operable grid cutter hereinabove referred to.

Another and important object of the invention is the employment, in a punch press or forming device for the purpose set forth, of the support wires of the work piece as parts of the die member and to associate with the opposing forming slides, or punch members, a cutting means whereby the complete operation of cutting and forming the grid leaves no distortion of the support wires at their sheared ends.

And, a still further object of the invention is to provide a device of the character described which will be of few parts, simple in construction, positive in operation and not liable to derangement.

To these ends the invention consists of certain parts and combinations of parts as will be fully set forth in the following description and particularly defined in the appended claims.

The accompanying drawings illustrating the invention and forming a part of the specification are as follows.

In the drawings similar reference numerals refer to similar parts throughout the several views.

Referring first to Figs. 1 to 9, inclusive:

The numeral 1 represents a base plate which, in this instance, is of rectangular form. Extending longitudinally of the base and secured thereto adjacent its side edges are a pair of guide rails 3 between which and held in sliding engagement with the base by inturned flanges 5 on the rails is a U-shaped carriage indicated generally by the numeral 6 and comprising parallel side arms 8 and a cross bar 9. Centrally disposed on the bar 9 and rigidly secured thereto is a block 10 into which is threaded the outer end of the piston rod 14 of an air cylinder 15 having a packing gland 16 through which the rod is slidable. Movement of the carriage forward and back is effected by reciprocation of the piston, not shown, in the cylinder 15, the cross bar 9 abutting a fixed stop 17 on completion of the return movement of the carriage. The air conduits 18 and 19 lead from a valve controlled by a foot treadle which, with the valve, is of known construction and operation and for that reason not shown in the drawings.

Figures 1, 2, 3:
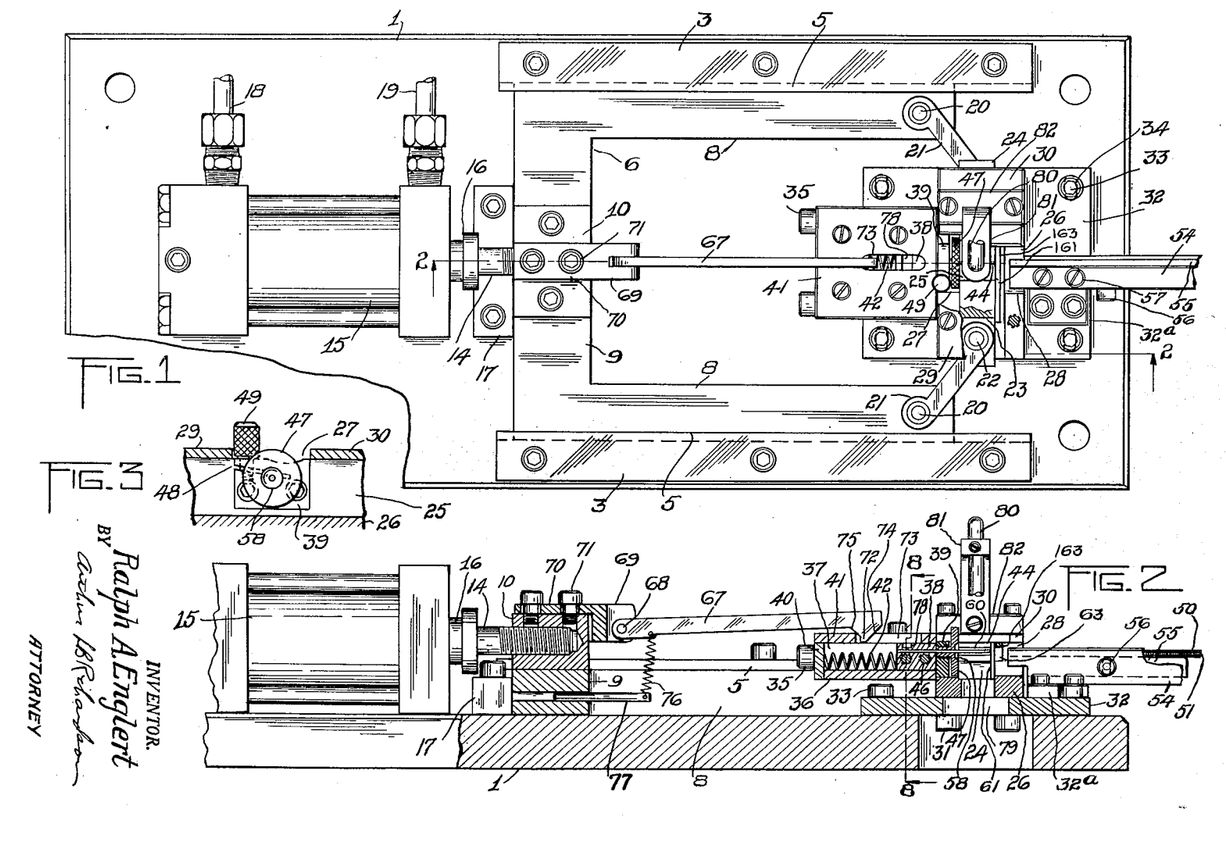
Fig. 1 is a top plan view showing one modification of the invention but with the thrust sustaining side brackets removed.
Fig. 2 is a view partly in side elevation and partly in vertical section on line 2—2, Fig. 1.
Fig. 3 is a fragmentary sectional detail of the forming slide housing and shows in end view the adjustable stop screw and locking means associated therewith.

Pivoted at 20 to the forward end of each side arm 8 of the carriage is one end of a link 21 which, at its other end, has pivotal connection by stud 22 with the outer bifurcated end of one of a pair of forming slides 23, 24 mounted for reciprocating movement in a direction at right angles to that of the carriage. These members 23 and 24 are guided for sliding movement in the channel 25 of a housing 26, the center portions of the channel walls being cut away at 27 and 28 for the inner and outer side walls, respectively, but to a less depth than the channel so that continuous guiding surfaces remain for the slide members as is more clearly illustrated in Fig. 6. Covering the channel 25 for the greater part of its length, from its outer ends inwardly, and as means for holding the slides against upward displacement, are removable cover plates 29 and 30. The housing 26 is mounted in a fixed position by screws 31 upon a plate 32 which by screws 33 engaging through elongated slots 34 therein is secured to the base in a manner permitting adjustment of the plate and parts carried thereby in the direction of movement of the forming slides.

Secured to the inner face of the housing 26, that is, to the left with respect to Figs. 1 and 2, by screws 35 is a block 36 which extends across the opening 27 and is formed with an upwardly opening channel 37 for slidably receiving a plunger 38. This channel is closed at one end by a removable plate 39 arranged within the opening 27 and at its other end by a removable cap 40. The channel 37 has a removable cover plate 41 and housed within the channel between the plunger 38 and end cap 40 is a coiled compression spring 42 functioning normally to urge the plunger forward against the plate 39. One side of the plunger 38 is recessed longitudinally at 43 and cut in the bottom wall of such recess is a slot for receiving the inner end of a mandrel 44 which is held in place by a clamp 45 fitted to the recess 43 and tightened against the mandrel by screws 46, see Fig. 8. The term "mandrel" is here intended to mean a body of any shape about which the work may be bent by the forming slides.

The mandrel extends forward through an axially aligned aperture in a knurled head thumb screw 47 threaded into the plate 39 which latter has a saw cut 48, as shown in Fig. 3, and a lock screw 49 whereby there may be effected a binding of the plate on the thumb screw to lock the screw in its position of adjustment, the mandrel projecting beyond the head of the screw a distance equal to the length of grid unit to be cut and such adjustment of the screw permitting a predetermined slight variation in such length.

Figures 4, 5, 6:
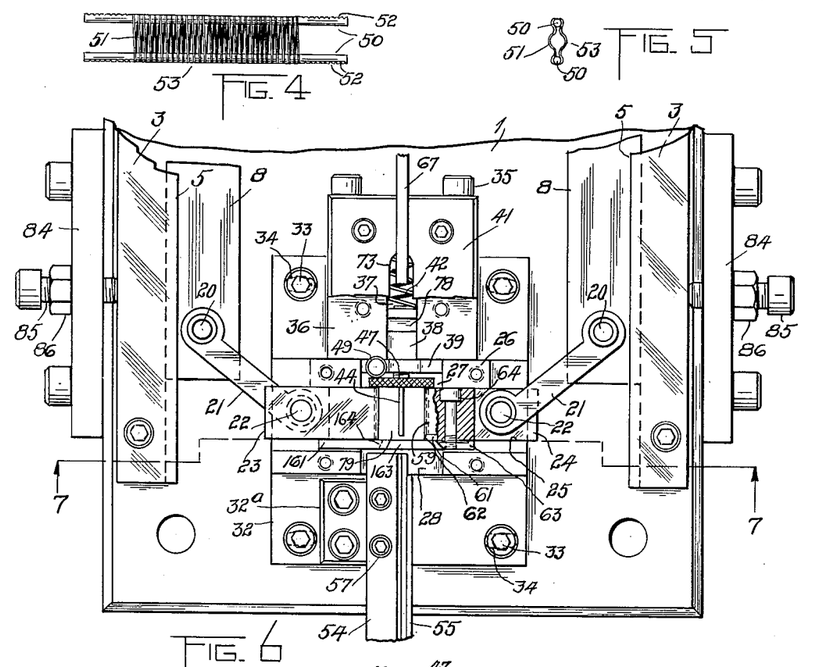
Figs. 4 and 5 are enlarged side and end views, respectively, of one of the completely formed grids.
Fig. 6 is a top plan view drawn to full size of the right hand end of the machine illustrated in Fig. 1 but with the cover plates for the forming slides removed and with other parts broken away to show details of construction.
Figures 7, 8, 9:
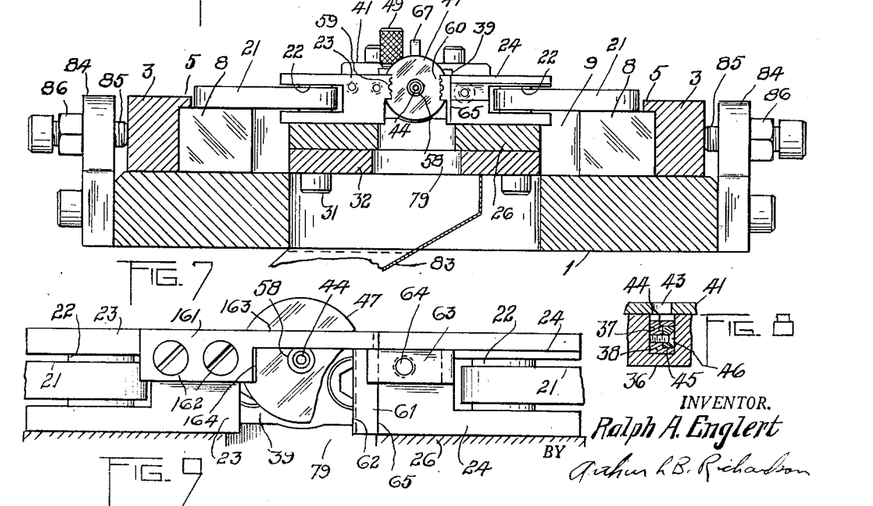
Fig. 7 is a sectional view on line 7—7 of Fig. 6.
Fig. 8 is a sectional detail on line 8—8 of Fig. 2.
Fig. 9 is an enlarged view showing in front elevation the cutting knives in substantially their outermost position, the forming slides to which the knives are attached and the adjustable stop for the grid strip.

The grid strip, or work piece, includes spaced parallel wires 50 and a cage-like winding of fine wire 51. Such a strip as processed on one type of grid winding lathe comprises the two spaced parallel support wires 50 around which the fine wire 51 is wound at a constant pitch and over a centrally disposed mandrel, the successive convolutions lying in spaced segmental grooves 52 formed in the wires 50 by a cutting tool operating just in advance of the wire 51 as it is wound. And, following such winding, a swaging tool operates on the ridges formed alternately with the grooves on the wires 50 to lock the transverse winding in place. At regularly spaced intervals longitudinally of the wires 50 the swaging tool does not function, thus leaving a predetermined number of the grooves open, so that when the strip is cut into unit lengths 53, as indicated in Fig. 4, loose ends of the fine wire will unwind from the open grooves. These ends are then broken off so as to leave unwound terminals on the posts 50 at each end of the winding for insertion into the grid supporting means.

The grid strip is supported for sliding movement along a member extending to the right, with respect to Figs. 1 and 2, and including two bars 54 and 55 secured together by screws 56 to form an angle plate, the bar 55 being the support upon which the grid strip is placed edgewise and guided by a shoulder portion formed by the upper part of the bar 54. Preferably the bar 55 is adjustable on the bar 54 so that the grid strip may be supported with its axis in true alignment with that of the mandrel 44. The inner end of bar 54 is secured by screws 57 to a plate 32ª which in turn is rigidly secured to the top face of plate 32 transversely adjustable on the base 1, the inner end of this grid support terminating sufficiently short of the slides 23 and 24 to clear the cutter blades carried by such slides and later to be described. The head of screw 47 functions as an adjustable stop for the grid strip as the latter is moved along its supporting member by the hand of the operator, the end face of the screw head having a flaring mouthed counterbore which provides a recess 58 coaxial with the mandrel for centering the strip and against the bottom wall of which the wires 50 abut in the manner illustrated more clearly in Fig. 15.

The opposing hardened end faces of the slides 23 and 24 are grooved at 59 to mate with the mandrel 44 which, in this instance, is shown as a round rod, and at 60 with shallower grooves paralleling the groove 59 for mating with the rods 50 which latter, it will be observed, are spaced from the mandrel to provide open spaces for receiving the ridges formed on the slides between the grooves 59 and their respective grooves 60. Thus, with the grid strip engaging over the mandrel coaxially therewith, and with the side wires 50 lying in a plane coincident with the mandrel axis and at right angles to the direction of movement of the slides, the wires 50 of the work piece function with the mandrel as the die member of a press in which the punches, comprising the slides 23 and 24, bend the wire 51 against the die and into the spaces between the mandrel 44 and wires 50, the result of which is a reshaping of the transverse contour of the grid from that shown in Fig. 16 to that shown in Figs. 5 and 17.

As a means for shearing the wires 50 a cutter is secured to the outer face of each forming slide. In the modification of the invention now being referred to the inner cutter 61 having a knife edge 62 is a comparatively narrow, flat bar set in a recess formed in the slide 24 and held to the slide by a clamp 63. A screw 64 extending through the slide from the rear and threaded into the clamp holds the latter in place and the thrust against the cutter is sustained by the shoulder 65 of the recess in which the cutter is set. The outer cutter blade is of somewhat heavier stock and comprises a body portion 161 fastened by flat-head screws 162 to the outer face of slide 23, and a pilot or finger 163 extending beyond the cutting edge 164 to ride in sliding engagement with the outer face of the cutter 61 and above the clamp 63. This finger 163 acts also as a guide in feeding the work into the locating recess 58 of the stop screw 47 and, with the work support 55, as a means to prevent spreading of the wires 50 during the cutting operation.

At 67 is shown a latch which, at one end, is pivoted at 68 to the bifurcated overhanging head portion 69 of a connecting plate 70 secured for adjustment in the direction of the carriage movement by screws 71 extending through elongated slots in such plate and threaded into the block 10. The free, forward end of the latch is formed with a detent 72 which travels in a slot 73 in the cover plate 41 of the housing member 36. The latch in front and in rear of the detent is formed with cam surfaces comprising the bevelled edge portions 74 and 75, respectively. A coiled tension spring 76 anchored at one end to the latch and at its other end to fixed pin 77 exerts a downward pull on the latch.

Operation of the device is as follows:

The grid strip guided along the supporting bars 54 and 55 is moved toward the left under the finger 163 onto the mandrel 44 and into the locating recess 58 in the stop screw 47. Air is then admitted to the cylinder 15 to effect a forward or operative movement of the carriage 6 whereupon the links 21, exerting leverage on the slides 23 and 24, cause movement of the latter toward each other to form the grid and of the cutters carried thereby to shear the wires 50. The cutters are so set that cutting action takes place slightly in advance of the forming, although the operations are practically simultaneous. And, to help sustain the thrust exerted through the links 21 and side arms 8 of the carriage 6 against the guide rails 3, brackets 84, illustrated in Figs. 6 and 7 but not shown in Fig. 1, are bolted to the sides of the base 1, each such bracket having a screw 85 extending therethrough into contact with a side arm 8 and held in its desired position of adjustment by a lock nut 86.

Latch 67 moves forward with the carriage 6, the detent 72 traveling in the slot 73 until the cam surface 74 engages the top rear edge of the plunger 38 whereupon the latch rides on the plunger until the end of the stroke at which time the detent is over a cross channel 78 in the plunger and into which it drops by action of the spring 76. The latch, on reverse movement of the carriage, effects a withdrawal of the plunger and with it the mandrel 44 so that the grid unit 53 is permitted to drop through the opening 79 extending through the base 1 and superimposed parts 32 and 26. Before the carriage reaches the end of its rearward movement and abuts the stop 17, the cam surface 75 of the latch rides on the end wall of the slot 73 to disengage the detent from the plunger and permit the latter under action of spring 42 to resume its normal position with the mandrel again extended forward of the stop screw 47.

The grid 53 being very light in weight is hastened in its fall through the opening 79 by the impingement of a jet of air directed against it from a tube 80 supported adjacent its discharge end in a bracket 81 secured to a supporting plate 82 mounted upon the cover plate 30 of housing 26. The grids may drop into any suitable receptacle, not shown, although it is preferable that they fall into a chute, indicated at 83 in Fig. 7, from which they are successively presented to the operative who trims the loose ends of the grid wire and places the grids into individual compartments of a tray.

In Figs. 10, 11, 12, 13, 14, 18 and 19 there is shown a modification of the invention involving the same principles of operation as in the modification hereinabove described, but so designed that the parts are fewer in number and in more compact relation. Also, provision is made for cutting and forming grids of different sizes. Figs. 15, 16, 17 and 20, it may be stated, are illustrative of both modifications of the invention.

The base 90 is shown as a casting formed with a depending peripheral flange 91, a raised portion 92 across its forward end, and on the under side adjacent its rear end with a pair of depending arms 93 spaced one each side of a centrally disposed opening 94.

The carriage includes a U-shaped member 95, the side arms 96 of which are relatively short in comparison with those of the carriage 6 in Fig. 1. This member 95 constitutes a cross-head secured to the reduced forward end of a centrally disposed, longitudinally extending slide 97 guided for reciprocating movement by parallel side rails 98 secured by screws 99 for relative adjustment toward and from each other on the base 90 and arranged in rear of the raised part 92. The side faces of the slide 97 are bevelled and the adjacent ones of the guides 98 are correspondingly formed so that the member 97 is held in sliding engagement with the base 90.

The air cylinder 100 is mounted upon the under side of the base and is reversed with respect to the cylinder shown in Figs. 1 and 2, that is, with the piston rod 101 extending rearwardly. In this view the piston is indicated at 87. The rod 101 is threaded into a spacer 102 between and pivotally connected at 88 to the side arms of a vertically arranged lever 103 mounted at its lower end for oscillating movement on a shaft 89 supported in the arms 93, its upper end extending through opening 94 in the base and into an elongated opening 104 in the slide 97 to which latter member it is pivotally connected at 105 through the medium of a short link 106 operating in the opening 104.

Pivotally connected at 107 to the forward end of each side arm 96 is one end of a link 108 which, at its other end, has pivotal connection at 109 with the bifurcated end of the corresponding one of a pair of slides 110 and 111. These slides are guided for movement transversely of the direction of movement of the carriage by the side walls 112 and 113 of a housing 114 which, by screws 115 engaging through elongated slots 116 in the base thereof, is mounted for adjustment in the direction of movement of the slides, upon the raised portion 92 of the base.

The slides 110 and 111 are shown as being wider than the corresponding parts 23 and 24 seen in Figs. 1, 2, and 6, the purpose of which is that provision may be made for cutting grids of different lengths. To this end the grooves 59 and 60 for mating with the mandrel 44 and grid support wires 50 are cut in the opposing end faces of the body portions 117 and 118 of hardened inserts 119 and 120, respectively, for the slides 110 and 111. The length of these grooved portions is determined by the length of grid to be cut. The inserts are removably attached to their respective slide members by screws 121 extending inwardly from the outer end faces of the slides and threaded into the inserts. In the outer side face of slide 111 there is a longitudinally extending channel 122 adapted to receive a clamp 63 for holding the inner cutter blade 61 in a recess formed therefor in the outer face of the insert 120, the clamp being held in place, in this instance, by a screw 64ª extending through an aperture in the clamp and threaded into the insert.

The outer side face of slide 110 is recessed at 123 but part way of its length so as to leave stock at 124 through which is threaded an adjustable screw 125 on which is a lock nut 126. This screw sustains the thrust exerted on an outer cutter similar to that shown in Fig. 9 in that it has a like cutting edge 164 and pilot finger 163. In this instance, however, this cutter member is adjustable toward and from the work by having in its body portion 161 an elongated slot 127 through which a holding screw 128 passes and is threaded into the insert 119. The channel formed by the side walls 112 and 113 is provided with removable cover plates 129 and 130, a bracket 131 being mounted upon plate 130 for supporting the discharge end of the air line 132.

Side wall 113 of the housing 114 has its central portion cut away at 133 to receive the inner end of the work support which is shown as a bar 134 having a longitudinally extending channel 135 in which the grid strip is guided on edge for sliding movement, this bar adjacent its inner end being secured by screws 136 to a block 137 carried by the housing.

The work is fed into a locating recess 58 in the end face, in this instance, of a reduced axial extension or pilot 138 of the knurled head of an adjustable stop screw 139, such recess being similar to and for the same purpose as the recess of like numeral in the screw 47 of Figs. 1, 2, 6, 7 and 9. This screw 139 is threaded into a block 140 extending across the central opening 141 of the side wall 112 and secured to the outer face of the wall by screws 142. A lock nut 143 on the screw 139 and bearing against the member 140 holds the screw in the desired position on axial adjustment.

In a housing 144 extending rearwardly from the block 140 and secured thereto by screws 145 is a longitudinally extending channel 146 for slidably receiving a plunger 147, such channel being closed at one end by the block 140, at its other end by a removable cap 148 and on its open side by a removable cover plate 149.

A mandrel, also indicated by the same numeral 44 as the like part in the first described modification of the invention, slidably extends through axially aligned openings in the block 140 and screw 139 and has its forward end projecting beyond the screw extension 138 a distance equal to the length of grid to be cut. The rear end of the mandrel extends into the plunger 147 and is clamped thereto by any suitable means as, in this instance, a plate 150 fitted to a recess in a side of the plunger and drawn against the mandrel by screws 151. The plunger is normally urged to its forward position against the block 140 by a coiled compression spring 152 interposed between the plunger and the end cap 148 and encircling a rod 153 extending rearwardly through an aperture in the closure 148 in axial alignment with the mandrel. This rod 153 is secured to the plunger 147 by a set screw 154 and fixed thereon adjacent its rear end is an axially adjustable collar 155.

A latch 156 pivoted at 157 to blocks on the carriage slide member 97 has a detent 158 at its free end terminating in an inclined surface 159, this latch normally being held in a substantially horizontal position against a stop bar 160 by a tension spring 165. Just prior to completion by the carriage of its forward movement the latch is lifted by engagement of its inclined surface 159 with the collar 155 and then, at the completion of such movement, is urged by spring 165 to drop with the detent in locking engagement with said collar. On return movement of the carriage the latch 156 effects a withdrawal of the mandrel through the medium of rod 153 and plunger 147 to permit discharge of the severed grid through an opening 166, such discharge being hastened by impingement against the grid of an air jet from the tube 132. And just before completion of such return movement, the latch by engagement of a depending tail portion thereof with an adjustable stop screw 167 in an arm 168 upstanding from the base 90 is released from the collar 155, thus permitting the plunger under action of spring 152 to again carry the mandrel forward into operative position. A fixed stop 169 and an adjustable stop screw 170 limit the throw of the piston actuated lever 103.

From the foregoing it will be observed that in each modification of the invention there is provided a base upon which a carriage is mounted for reciprocating movement through its connection with the piston of an air cylinder; that such carriage includes a U-shaped member to the side arms of which are pivoted links which in turn, through their leverage action, impart reciprocating movement toward and from each other of a pair of opposing slides, the direction of movement of the latter being transversely to that of the carriage; that these slides constitute forming tools cooperating with a mandrel and the side wires of a grid strip to give form to the fine wire of the grid; that these forming slides carry cutters for shearing the said side wires; that the mandrel is retracted to permit ejection of the work piece on movement of the carriage to inoperative position; and, that just prior to completion of such inoperative movement the mandrel is released to return under spring pressure to its operative position.

Figure 10:
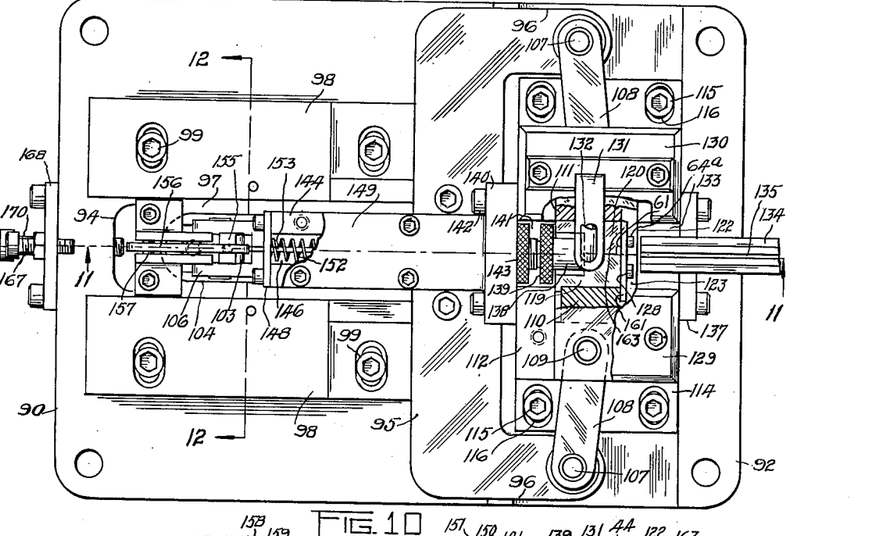
Fig. 10 is a plan view similar to Fig. 1 but of another modification of the invention.
Figures 11, 12, 13:
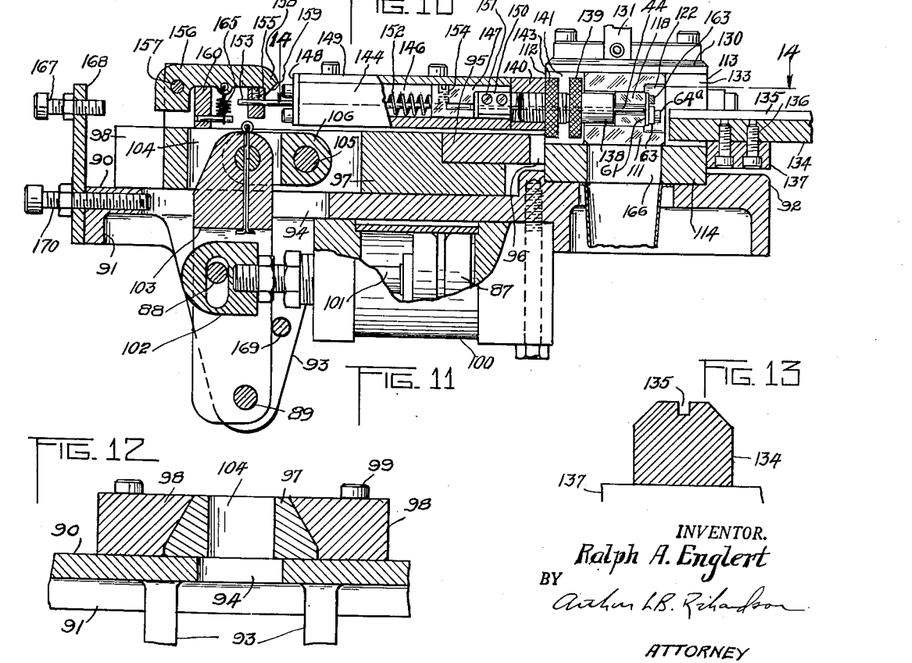
Fig. 11 is a view partly in side elevation and partly in vertical section on line 11—11, Fig. 10.
Fig. 12 is a sectional view of the slide and its guide members as taken on line 12—12, Fig. 10.
Fig. 13 is a transverse section of the grid strip support seen in Figs. 10 and 11.
Figures 14, 15, 16, 17, 18, 19, 20:
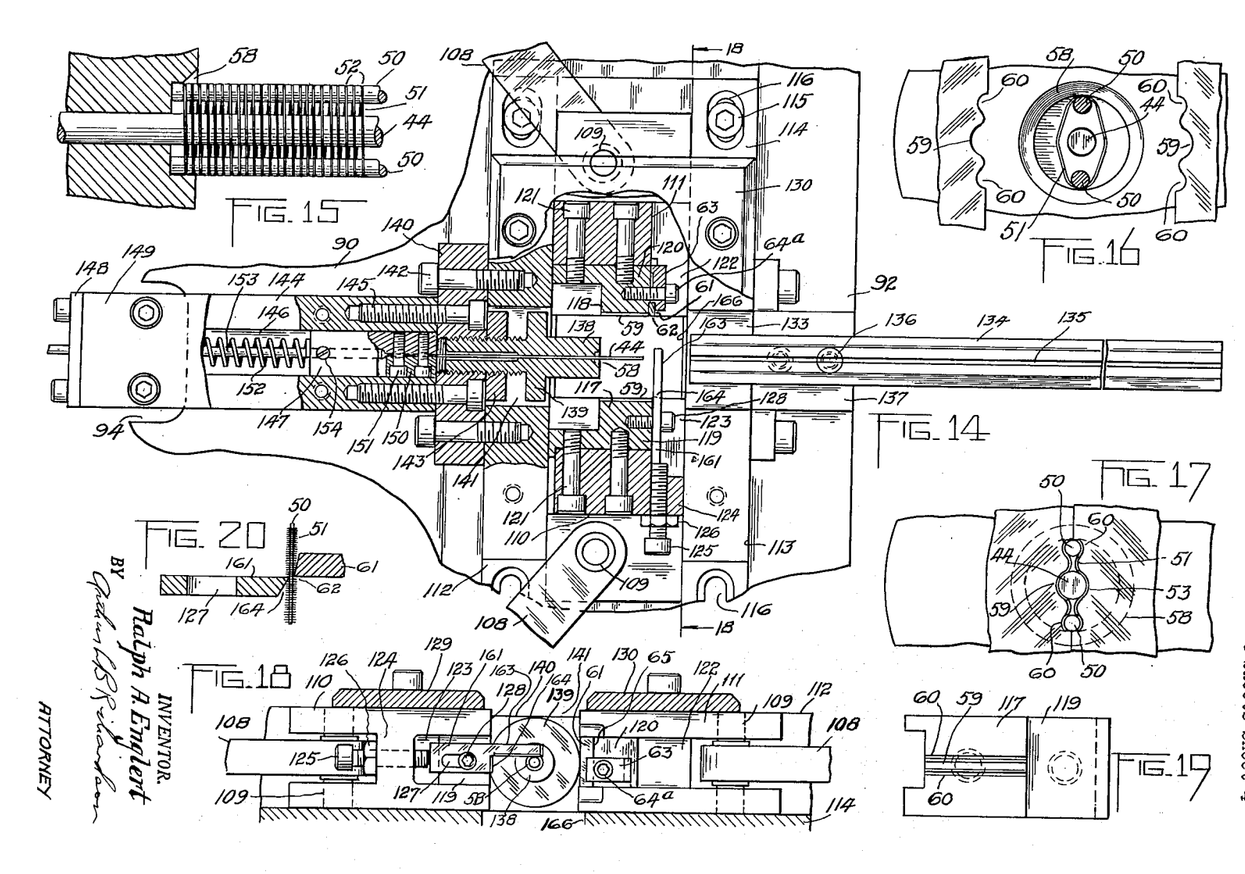
Fig. 14 is a fragmentary showing partly in top plan view and partly in horizontal section on line 14—14, Fig. 11, of the right hand end of the machine seen in Figs. 10 and 11.
Fig. 15 is a greatly enlarged side elevation of one end of a grid strip showing the support wires in abutment with the combined locating and adjustable stop screw, the latter being shown in central section.
Fig. 16 is an end view from the right of the parts seen in Fig. 15 and also shows fragmentary portions of the forming members in open or inoperative position.
Fig. 17 is a view similar to Fig. 16 but with the forming members in closed position.
Fig. 18 is a sectional view on line 18—18 of Fig. 14.
Fig. 19 is an enlarged view showing the forming face of the slide insert seen at the left in Fig. 18.
Fig. 20 is a horizontal sectional detail of the cutting members in position to sever a grid strip which latter is illustrated in edge view.

In Figs. 15, 16 and 17 the body part in which the locating recess 58 is formed is representative of either the stop screw 47 of the machine illustrated in Figs. 1 to 3 and 6 to 9 inclusive, or the pilot end 138 of the stop screw 139 of the modified machine illustrated in Figs. 10, 11, 14 and 18, and for that reason no reference number for such part is indicated in those views. The forming inserts 119 and 120, the adjustable stop screw 139, the mandrel 44 and the plunger 147, in the machine shown in Figs. 10, 11 and 14, are interchangeable to meet the requirements necessitated by the size and shape of the grid to be cut and formed. That is, the size and shape of the mandrel to be used determines the axial opening through the stop screw and plunger while the length of the pilot extension 138 on the stop screw is made longer or shorter accordingly as the length of grid calls for shorter or longer forming faces 117 and 118 on the inserts.

When used in connection with a grid strip winding lathe, the grid cutting and forming device is substituted for the usual manually operable grid cutter and arranged either horizontally or at an angle whichever is most convenient for the operative when in a sitting position.

Although I have shown and described particular embodiments of my invention, I do not desire to be limited to the embodiments described, and I intend in the appended claims to cover all modifications which do not depart from the spirit and scope of my invention.

What I claim is:

1. A cutting and forming machine for a grid strip including spaced parallel side wires around which is a cage-like winding of finer wire, said machine including a base, a stop, means along which said grid strip is slidably supported for edgewise feeding movement against said stop, two slides movable toward and from each other on said base transversely of the direction of said feed, means for effecting reciprocation of said slides, cutters carried by said slides for severing that portion of the grid strip between said stop and said cutters, and opposing end faces on said slides formed to mate with said side wires and re-shape the transverse contour of the fine wire winding of said severed grid strip portion.

2. A cutting and forming machine for a grid strip including spaced parallel side wires around which is a cage-like winding of finer wire, said machine including a base, a stop, means along which said grid strip is slidably supported for edgewise feeding movement against said stop, said stop having a locating recess for receiving the stop abutting ends of said side wires, two slides movable and from each other on said base transversely of the direction of said feed, means for effecting reciprocation of said slides, a cutter carried on the outer face of each of said slides, said cutters cooperating to shear the grid strip, and opposing end faces on said slides formed to mate with said side wires and re-shape the transverse contour of the winding on the sheared end of said grid strip.

3. A cutting and forming machine for a grid strip including spaced parallel side wires around which is a cage-like winding of finer wire, said machine including a base, a stop, means along which said grid strip is slidably supported for edgewise feeding movement against said stop, said stop being adjustable in the direction of said feed, locating means on said stop for receiving the stop abutting ends to said side wires, two slides movable toward and from each other on said base transversely of the direction of said feed, means for effecting the reciprocation of said slides, a cutter secured to the outer face of one of said slides, a cutter secured to the outer face of the other of said slides, a knife edge on each of said cutters, a pilot in the plane of and extending forward from said second-named cutter above its knife edge and movable across the face of said first-named cutter, said grid strip engaging between the said support therefor and said pilot, and opposing end faces on said slides formed to mate with said side wires and reshape the transverse contour of the winding on the sheared end of said grid strip.

4. The combination, in a grid cutting and forming machine, of a base having a channel, a slide guided for reciprocating movement in said channel and means for effecting such movement, an end face on said slide formed to shape the grid, said slide having a recess in one side thereof to provide a shoulder, a cutter set in said recess so that the thrust against the cutter is sustained by said shoulder, and a clamp on the recessed side of said slide for removably holding said cutter in place, the engaging side wall, on the clamp side of said slide, of one of the relatively movable members in said reciprocating movement being recessed to receive said clamp.

5. In a grid cutting and forming machine, a combination in accordance with claim 4 characterized by said clamp receiving recess being a longitudinally extending groove in a side wall of said slide.

6. In a grid cutting and forming machine, the combination with a base having a channel, of a slide guided for reciprocating movement in said channel and means for effecting such movement, an end face on said slide formed to shape the grid, said slide having a recess in one side thereof part way of its length to provide a shoulder portion, a cutter set in said recess and adjustably secured to said slide, and an adjustable thrust sustaining stop screw extending through said shoulder portion into engagement with said cutter.

7. In a grid cutting and forming machine the combination, with a base having a channel and an opening through the side walls of the channel at right angles thereto, of two slides guided for reciprocating movement in said channel, one each side of said opening, and means for effecting such movement of the slides, a stop, a mandrel axially movable through said stop to project across said channel from one end of said opening, spring means for moving said mandrel into operative postion, a support along which a grid strip is fed to engage over said mandrel from the other end of said opening, opposing end faces on said slides formed to shape that portion of the grid strip engaging over said mandrel, a cutter carried by each of said slides on its side face adjacent said support, said side faces of the slides being recessed to receive their respective cutters which engage each other in shearing relation, a pilot extension on the outer one of said cutters and lying in the plane thereof above its cutting edge, said extension on movement of the slides toward each other slidably engaging over the face of the other cutter and in the recess of the slide carrying the inner cutter, and means actuated on movement of the slides to inoperative position to effect a retraction of said mandrel.

8. A grid cutting and forming machine in accordance with claim 7 characterized by said stop being adjustable toward and from the plane of said cutters and formed with a recess coaxial with said mandrel, said recess functioning as a locating means for the abutting end of said grid strip.

9. In a machine for cutting and forming grids of the character described, the combination with a base, two opposing forming slides mounted for reciprocating movement on said base and means for effecting such movement, of a mandrel centered with respect to said slides and mounted for axial movement, spring means functioning to normally hold said mandrel with a portion of its length projected across the plane of movement of said slides, a support along which a grid strip is guided for edgewise movement onto said mandrel, means for shearing the grid strip including a cutter carried by each of said slides, and means actuated on return movement of said slides for effecting a retraction of said mandrel.

10. In a machine for cutting and forming grids of the character described, the combination with a base having an opening, two opposing forming slides mounted for reciprocating movement on said base and means for effecting such movement, of a mandrel centered with respect to said slides and mounted for axial movement, spring means functioning to normally hold said mandrel with a portion of its length projected across the plane of movement of said slides, a support along which a grid strip is guided for edgewise movement onto said mandrel, means for shearing the grid strip including a cutter carried by each of said slides, means actuated on return movement of said slides to inoperative position for effecting a retraction of said mandrel, and means for accelerating the fall of the severed grid through the said opening.

11. In a grid cutting and forming device the combination, with a guiding support for a grid strip, said strip including spaced parallel side wires around which a fine wire is coiled, of a stop against which an end of said grid strip is fed, a mandrel guided for axial movement through said stop coaxially with the grid strip, two opposing slides guided for reciprocating movement transversely of said mandrel, the opposing faces of said slides being formed to mate with said side wires and said mandrel and to re-shape the transverse contour of the coiled wire, means for reciprocating said slides, cutters carried by said slides for shearing said grid strip, spring means for normally holding said mandrel in operative position to receive a pre-determined length of said grid strip, and means actuated on the inoperative movement of said slides to retract said mandrel.

12. In a grid cutting and forming device the combination, with a guiding support for a grid strip, said strip including spaced parallel side wires around which a fine wire is coiled, of a stop against which an end of said grid strip is fed, a mandrel guided for axial movement and aligned coaxially with the grid strip, two opposing slides guided for reciprocating movement transversely of said mandrel, means on said support whereby the grid strip is guided in its feeding movement with the axes of said support wires and said mandrel lying in a plane at right angles to said slides, the opposing faces of said slides mating with said side wires and said mandrel and formed to engage into the intervening space between the mandrel and the side wires to reshape the transverse contour of the coiled wire, cutters carried by said slides for shearing said grid strip, means for reciprocating said slides, spring means for normally holding said mandrel in operative position to receive a predetermined length of said grid strip, and means actuated on the inoperative movement of said slides to retract said mandrel.

13. In a grid cutting and forming machine, a base, a longitudinally extending support upon which a grid strip is fed in endwise movement, a carriage mounted for reciprocating movement parallel to said support, a motor, an operating connection between said motor and said carriage, a housing mounted upon said base and having a channel at right angles to said support, there being a communicating grid discharge opening through the bottom of said channel and said base, two opposing forming slides guided for movement toward and from each other in said channel, connections between said carriage and said slides whereby the forward and return movements of said carriage affect, respectively, the movement toward and from each other of said slides, an extension from said housing channeled to slidably receive a spring pressed plunger normally urged to its forward position, an adjustable stop screw threaded into an end wall of said extension and having an axial opening therethrough, a mandrel clamped to said plunger and extending through said axial opening to project normally across said channel coaxially with and to receive a predetermined length of said grid strip, a cutter carried on the outer side face of each of said slides, means including a spring-controlled latch pivoted on said carriage for effecting a withdrawal of said plunger and mandrel on return movement of said carriage, and means engaging said latch to disengage it from said plunger on return movement of the carriage.

14. A combination in accordance with claim 13 characterized by said motor being an air cylinder, by said carriage being U-shaped and including a cross bar to which said operating connection is pivoted and side arms straddling said housing, by the connections between said slides and said carriage being pivoted links, and by the open sides of the channels in said housing and housing extension being closed by removable cover plates.

15. In a grid cutting and forming machine, a base, a housing adjustably mounted upon said base, parallel side walls on said housing forming a channel, an opening being cut across said side walls at right angles to said channel, a carriage slidably mounted on said base and including side arms and a cross bar, the side arms straddling said housing, two opposing grid forming slides guided in said channel one each side of said opening, shearing cutters on the outer side faces of said slides, links connecting said slides and said side arms whereby forward and return movement of the carriage effects, respectively, a movement of said slides toward and from each other, an air cylinder, a piston, a connection between said piston and said carriage for reciprocating the carriage, a plate on the outer side face of said inner channel wall and bridging the said wall opening, a housing extension projecting laterally from said plate and channeled longitudinally to slidably receive a spring pressed plunger normally urged to its forward position, an adjustable stop screw threaded into said plate and having an axial opening therethrough, the head of said screw lying in said opening of the inner wall, a grip strip support extending in the direction of said carriage movement with its inner end projecting into the said opening in the outer channel wall, a mandrel clamped to said plunger and extending through the axial opening in said stop screw to project normally across said slide channel coaxially with and to receive a pre-determined length of a grid strip on said support, means including a spring controlled latch pivoted on said carriage for effecting a withdrawal of said plunger and mandrel on return movement of said carriage, means engaging said latch to disengage it from said plunger on return movement of the carriage, a work discharge opening in said base and extending through the bottom wall of said channel, and means for directing a jet of air against the severed grid to accelerate its fall through said discharge opening.

16. In a grid cutting and forming machine, a base, a housing on said base, parallel side walls on said housing forming a channel, said walls having an opening therethrough at right angles to said base, a plate secured to the outer side face of the inner one of said walls and extending across the said opening therein, two opposing slides guided for movement toward and from each other in said channel, one each side of said opening, means for effecting reciprocation of said slides, said slides including inserts removably attached to the opposing end faces thereof and grid forming portions on said inserts, cutters on the outer side faces of said slides, a support for a grid strip, the inner end of said support entering the said opening in the outer wall, an axially adjustable stop screw for the grid strip threaded into the said plate and having an axial opening therethrough terminating in a counterbore at its forward end, a head on said screw lying in the said opening of said inner wall, an extension on said head opposed to the body of the screw, a mandrel axially movable through said screw aperture and normally projecting beyond said head extension a distance equal to the length of grid to be cut, and means for retracting said mandrel on outward movement of said slides, said counterbore providing a locating means for the inner end of the grid strip, and an opening being formed through said base and the bottom of said channel for the discharge of the severed grid.

RALPH A. ENGLERT.

REFERENCES CITED

The following references are of record in the file of this patent:

UNITED STATES PATENTS

| Number | Name | Date |
|---|---|---|
| 250,014 | Stover | Nov. 22, 1881 |
| 319,982 | Lasar | June 16, 1885 |
| 371,492 | Detrick | Oct. 11, 1887 |
| 456,533 | Bold | July 21, 1891 |
| 993,974 | Fielding | May 30, 1911 |
| 1,014,829 | Lepper et al. | Jan. 16, 1912 |
| 1,213,480 | Hart | Jan. 23, 1917 |
| 1,721,636 | O'Brien | July 23, 1929 |
| 1,838,819 | Flaws | Dec. 29, 1931 |
| 1,978,108 | Howald | Oct. 23, 1934 |
| 1,994,307 | Flaws | Mar. 12, 1935 |
| 2,045,121 | Carvalho | June 23, 1936 |
| 2,116,971 | Haslauer | May 10, 1938 |
| 2,200,886 | Kuhn | May 14, 1940 |
| 2,212,886 | Ruland | Aug. 27, 1940 |
| 2,225,853 | Baker | Dec. 24, 1940 |
| 2,329,769 | Kinyon | Sept. 21, 1943 |